United States Patent
Wagner et al.

(10) Patent No.: US 10,442,475 B2
(45) Date of Patent: Oct. 15, 2019

(54) METHOD AND DEVICE FOR PERFORMING OPEN-LOOP CONTROL OF A DRIVER'S CAB MOUNT

(71) Applicant: MAN Truck & Bus AG, München (DE)

(72) Inventors: Philipp Wagner, Friedberg (DE); Jan Fleischhacker, Olching (DE); Christian Kohrs, Plochingen (DE)

(73) Assignee: MAN TRUCK & BUS AG, München (DE)

( * ) Notice: Subject to any disclaimer, the term of this patent is extended or adjusted under 35 U.S.C. 154(b) by 76 days.

(21) Appl. No.: 15/655,293

(22) Filed: Jul. 20, 2017

(65) Prior Publication Data

US 2018/0029651 A1 Feb. 1, 2018

(30) Foreign Application Priority Data

Jul. 26, 2016 (DE) ........................ 10 2016 009 081

(51) Int. Cl.
*B62D 33/06* (2006.01)
*G05D 1/02* (2006.01)
(Continued)

(52) U.S. Cl.
CPC ......... *B62D 33/0604* (2013.01); *B60G 17/06* (2013.01); *B60G 99/002* (2013.01);
(Continued)

(58) Field of Classification Search
CPC ............ B62D 33/0604; B62D 33/0608; B60G 17/06; B60G 99/002; B60G 99/008;
(Continued)

(56) References Cited

U.S. PATENT DOCUMENTS 6,273,203 B1 * 8/2001 Paggi ................. B62D 33/0608
180/89.13
6,847,874 B2 * 1/2005 Stiller .................. B60G 17/018
280/5.5
(Continued)

FOREIGN PATENT DOCUMENTS

DE 102009010006 A1 10/2009
DE 102008063475 A1 7/2010
(Continued)

OTHER PUBLICATIONS

"All Shocks Absorbed—CV Damper Technology", Flyer Brochure from ZF Friedrichshafen AG (2014), pp. 1-28.
(Continued)

*Primary Examiner* — Laura Freedman
(74) *Attorney, Agent, or Firm* — Weber Rosselli & Cannon LLP

(57) ABSTRACT

A method for performing open-loop or closed-loop control of a driver's cab mount of a motor vehicle, wherein the driver's cab mount has dampers whose damper force can be adjusted, wherein the motor vehicle can be operated in a first driving mode in which the motor vehicle automatically carries out vehicle guidance comprising both a longitudinal guidance operation and a transverse guidance operation of the motor vehicle, and in a second driving mode where the motor vehicle can be controlled by the driver, in which driving mode a driver of the motor vehicle is intended to carry out at least part of the vehicle guidance, wherein when the motor vehicle is operated in the first driving mode, the adjustable dampers of the driver's cab mount are actuated or adjusted in such a way that pitching or rolling movements are reduced compared to the second driving mode.

8 Claims, 4 Drawing Sheets

(51) Int. Cl.
  *B60G 17/06* (2006.01)
  *B60G 99/00* (2010.01)

(52) U.S. Cl.
  CPC ....... *B60G 99/008* (2013.01); *B62D 33/0608* (2013.01); *G05D 1/021* (2013.01); *B60G 2204/162* (2013.01); *B60G 2300/026* (2013.01); *B60G 2400/96* (2013.01); *B60G 2800/012* (2013.01); *B60G 2800/014* (2013.01); *B60G 2800/019* (2013.01)

(58) Field of Classification Search
  CPC .......... B60G 2300/026; B60G 2400/96; B60G 2800/012; B60G 2800/014; B60G 2800/019; B60G 2800/0192; B60G 2800/0194; B60G 2204/162; G05D 1/021
  See application file for complete search history.

(56) References Cited

U.S. PATENT DOCUMENTS

| | | | | |
|---|---|---|---|---|
| 7,849,983 | B2 * | 12/2010 | St. Clair | B60G 99/002 188/267.1 |
| 8,240,679 | B2 * | 8/2012 | Kajino | B60G 17/0157 280/5.515 |
| 8,398,091 | B2 * | 3/2013 | Inoue | B60G 17/0157 280/5.507 |
| 8,935,034 | B1 | 1/2015 | Zhu et al. | |
| 9,238,489 | B2 * | 1/2016 | Schauer | B62D 33/0608 |
| 9,623,748 | B2 * | 4/2017 | Strasser | B60K 23/08 |
| 9,702,349 | B2 * | 7/2017 | Anderson | B60G 17/019 |
| 9,868,332 | B2 * | 1/2018 | Anderson | B60G 17/016 |
| 9,925,841 | B2 * | 3/2018 | Hrovat | B60G 17/0165 |
| 10,126,139 | B2 * | 11/2018 | Miller | G07C 5/008 |
| 10,259,451 | B2 * | 4/2019 | Wan | B60W 30/025 |
| 2008/0319609 | A1 | 12/2008 | Poilbout | |
| 2013/0041545 | A1 * | 2/2013 | Bar | B60G 17/0162 701/23 |
| 2013/0218414 | A1 | 8/2013 | Meitinger et al. | |
| 2014/0246820 | A1 | 9/2014 | Chen et al. | |
| 2014/0297116 | A1 * | 10/2014 | Anderson | H02K 5/12 701/37 |
| 2016/0303972 | A1 * | 10/2016 | Kuhne | B60W 30/12 |
| 2016/0364823 | A1 * | 12/2016 | Cao | G06Q 50/30 |
| 2018/0126817 | A1 * | 5/2018 | Russell | B60G 17/018 |

FOREIGN PATENT DOCUMENTS

| | | |
|---|---|---|
| DE | 102012200670 A1 | 7/2013 |
| DE | 102013204024 A1 | 9/2014 |
| DE | 102013019141 A1 | 5/2015 |
| DE | 102015214025 A1 | 2/2016 |
| DE | 102015217481 A1 | 3/2017 |
| WO | 2016/197068 A1 | 12/2016 |

OTHER PUBLICATIONS

Extrended European Search Report issued in corresponding EP application No. 17180294.5 dated Nov. 7, 2017.
European Office Action issued in corresponding EP Application No. 17180294.5 dated Dec. 7, 2018, 3 pages (English translations not available).

* cited by examiner

METHOD AND DEVICE FOR PERFORMING OPEN-LOOP CONTROL OF A DRIVER'S CAB MOUNT

BACKGROUND

1. Technical Field

The present disclosure relates to a method and a device for performing open-loop or closed-loop control of a driver's cab mount of a motor vehicle, in particular a utility vehicle, which can be operated in an autonomous or partially autonomous driving mode.

2. Description of Related Art

When configuring chassis control systems it is always necessary to make a compromise between comfort and driving safety. An ideal chassis should provide the best possible damping of vibrations which are excited by unevennesses in the roadway, and at the same time keep the wheel contact forces as constantly as possible at a predefined value because as a result the wheels have the highest longitudinal guidance and lateral guidance potential and guide the vehicle with optimum safety.

The damper systems which are currently present in vehicles can be divided into three groups: passive, semi-active and active damper systems. In the case of passive damper systems, the size and the direction of the force applied by the damper is generally only dependent on the relative speed of the damper. However, position-dependent dampers, e.g. so-called groove dampers, are also known. In passive damper systems, a change in the damper force characteristic curve during the driving mode is not provided. The adjustment of a vehicle with passive shock absorbers always constitutes a compromise, since different driving states have to be covered with the same chassis adjustment.

One solution for this conflict of objectives is to use semi-active shock absorbers which permit the damper characteristic curves to be changed over a wide range via electronic actuation, and therefore make available an optimum damper setting for different driving situations within a few milliseconds. However, suitable damper presettings, which are superior to a single adjustment of passive dampers, can also be selected for different load states, which, in particular in a utility vehicle, can bring about large differences with respect to the overall mass and centre of gravity.

In the case of semi-active damper systems, the characteristic curve thereof can be changed quickly and over a wide range during travel. In particular, such shock absorbers can be based on (proportional) adjustment valves which change the oil flow, or on magneto-rheological or electro-rheological liquids, wherein a magnetic or electrical field influences the viscosity of the liquid and therefore the damping force. Combinations of the technologies are also known from practice. In this way, various adjustment programmes can set the optimum damper force as a function of the current driving situation by means of an actuator element.

In the case of active damper systems, the desired force is made available in any direction by means of an actuator, independently of the relative speed of the damper.

The abovementioned damper systems are known not only for chassis mounting but also for the damping mounting of a driver's cab. Driver's cab mounts of the generic type, i.e. suspension devices for the sprung/damping suspension of a driver's cab of a motor vehicle relative to the vehicle chassis, are used, for example but not at all exclusively, in trucks, agricultural vehicles or heavy duty vehicles. Exemplary driver's cab mounts are known, for example, from Laid-Open Patent Applications DE 10 2008 063 475 A1 or DE 10 2012 200 670 A1.

While in the chassis both the driving comfort in the sense of reducing the vibrations of the body and the driving safety in the sense of uniform wheel contact forces can be influenced by means of semi-active or active elements, in the field of driver's cab mounts it is possible to influence only the vibrations of the driver's cab and therefore the comfort. However, as a result of the direct effect the influence is greater than that of chassis damping.

Owing to the sprung mounting of the driver's cab on the chassis frame, an undesired pitching movement occurs in or counter to the direction of travel during the braking or accelerating of the vehicle. Furthermore, in the case of cornering disadvantageous rolling movements of the driver's cab toward the outside of the bend occur. The reason is the relatively high centre of gravity of the driver's cab on the chassis frame. Such undesired degrees of freedom of movement such as pitching movements or rolling movements can be damped selectively and effectively by means of adjustable, e.g. semi-active, dampers. In particular, driver's cabs react to longitudinal acceleration with significant pitching movements owing to the relatively short length and the associated short bearing base.

Driver's cab mounts of utility vehicles whose damping can be adapted to different driving situations are known in practice. It is therefore known, for example, to adjust, for comfort reasons, the damper force of the adjustable dampers of the driver's cab mount to soft damping which, however, increases the damper force in the case of dynamic processes such as lane changes and braking processes or gear shifting processes.

In addition, motor vehicles which can be operated in an autonomous or partially autonomous driving mode in which the motor vehicle automatically carries out, by means of a driver assistance system, vehicle guidance comprising both a longitudinal guidance operation and a transverse guidance operation of the motor vehicle are known from the prior art.

Laid-Open Patent Application DE 10 2013 019 141 A1 discloses, for example, a method for operating a driver assistance system of a motor vehicle, wherein the driver assistance system automatically carries out, in an autonomous driving mode, vehicle guidance comprising both a longitudinal guidance operation and a transverse guidance operation of the motor vehicle and in the process receives a changeover signal which is configured to trigger, in the driver assistance system, a changeover from the autonomous driving mode into another predetermined driving mode in which according to the specifications a driver of the motor vehicle carries out at least part of the vehicle guidance.

Laid-Open Patent Application DE 10 2015 214 025 A1 discloses, for example, a method for operating a motor vehicle which is operated in an autonomous driving mode, wherein after the autonomous driving mode has been switched on a consumption-reducing and/or wear-reducing driving strategy of the motor vehicle is set.

Laid-Open Patent Application DE 10 2009 010 006 A1 also discloses a method for partially autonomously or autonomously driving a motor vehicle by means of a driver assistance system. In this context, data on the surroundings of the motor vehicle are determined by means of a surroundings sensor system. A driving strategy for the partially autonomous or autonomous driving is then determined from the surroundings data, wherein the driver assistance system transfers those driving functions of the driver of the vehicle if it is detected that the driver wishes to transfer the driving functions to the driver assistance system, wherein a driver intervention into the events on the road overrides the driver assistance system during the partially autonomous or autonomous travel.

SUMMARY

With respect to the increasing significance of vehicles which can be operated autonomously, an object of the present disclosure is to develop the known methods and devices for adapting the damper force of adjustable dampers of a driver's cab mount of a motor vehicle with respect to use in a vehicle which can be both actively controlled by the driver and can also be operated in an autonomous and/or partially autonomous driving mode.

These objects are achieved by devices and methods having the features of the independent claims. Advantageous embodiments and applications of the present disclosure emerge from the dependent claims and are explained in more detail in the following description with partial reference to the figures.

According to the present disclosure, a method for performing open-loop or closed-loop control of a driver's cab mount of a motor vehicle is made available, wherein the driver's cab mount has dampers whose damper force can be adjusted. The driver's cab mount can have, in particular, a suspension device for the damping and preferably also sprung suspension of the driver's cab of a motor vehicle relative to the vehicle chassis. The vehicle chassis can be a vehicle frame or a lead frame.

The motor vehicle can be operated here in an autonomous or partially autonomous first driving mode in which the motor vehicle automatically carries out, by means of a driver assistance system, vehicle guidance comprising both a longitudinal guidance operation and a transverse guidance operation of the motor vehicle. In the first driving mode, the driver assistance system assumes, for the purpose of autonomous driving, the driving functions which are necessary for the longitudinal guidance and transverse guidance of the motor vehicle, e.g. the steering, acceleration, braking or, if appropriate, the selection of the gear speed, i.e. the driver assistance system is designed for automatic driving by intervening in the engine controller, in a transmission and in a brake system of the utility vehicle. Such driver assistance systems are known per se from the prior art and are therefore not described in more detail here.

The motor vehicle can also be operated in a second driving mode in such a way that it can be controlled by the driver, in which driving mode a driver of the motor vehicle is intended to carry out at least part of the vehicle guidance himself. In the first driving mode, the vehicle therefore drives (partially) autonomously, and in the second driving mode the driver drives the vehicle actively.

The motor vehicle can be, in particular, a utility vehicle, e.g. a truck. The adjustable dampers can be embodied as semi-active or active dampers. The adjustable dampers can also be embodied as adjustable spring-damper devices. In this context, the damping and sprung elements are embodied structurally separately from one another or are embodied as combined spring-damper elements, e.g. an adjustable air spring with an integrated damper.

According to a general criterion of the present disclosure, the specified objects are achieved in that if the motor vehicle is operated in the first driving mode, the adjustable dampers of the driver's cab mount are actuated or adjusted in such a way that pitching and/or rolling movements are reduced compared to the second driving mode. If the vehicle were to travel along the same route with the same speed behaviour and acceleration behaviour twice in succession, specifically once in the (partially) autonomous first driving mode and once in the active second driving mode, the pitching and/or rolling movements during the travel along this route in the first driving mode would be less than when travelling along the route in the second driving mode.

According to a first aspect of the present disclosure, a method for adapting the damper force of adjustable dampers of the driver's cab mount of a motor vehicle is therefore made available, wherein the motor vehicle can be operated in an autonomous or partially autonomous first driving mode in which the motor vehicle automatically carries out, by means of a driver assistance system, vehicle guidance comprising both a longitudinal guidance operation and a transverse guidance operation of the motor vehicle, and in a second driving mode said motor vehicle can be operated in such a way that it can be controlled by the driver, in which second driving mode a driver of the motor vehicle is intended to carry out at least part of the vehicle guidance himself. The method is defined by virtue of the fact that if the motor vehicle is operated in the first driving mode, the adjustable dampers of the driver's cab mount are actuated or adjusted in such a way that pitching and/or rolling movements are reduced compared to the second driving mode.

Open-loop and closed-loop control methods for reducing and/or compensating rolling movements and pitching movements are known per se from the prior art and do not have to be described here in more detail. It is decisive that according to the present disclosure the closed-loop or open-loop control of the adjustable dampers is carried out in the first driving mode in such a way that pitching movements and/or rolling movements are suppressed to a greater extent than in the second driving mode.

In this way, the most comfortable possible damping of the driver's cab mount is implemented for partially autonomous or autonomous driving situations, which damping largely insulates the driver from the influence of the driving movements. This is intended, for example, to achieve a comfort level such as is known from modern trains. Secondary activities of the driver which are carried out in the first driving mode, for example reading, office activities etc. become possible with a reduced minimal stimulation from the outside and as far as possible without causing fatigue.

According to one particularly preferred embodiment, if the motor vehicle is operated in the first driving mode, a longitudinal acceleration which can be perceived by an occupant of the driver's cab in the case of longitudinal acceleration of the vehicle is at least partially reduced by virtue of the fact that in the case of longitudinal acceleration of the vehicle of the driver's cab is inclined forward by means of the driver's cab mount, e.g. by means of the dampers and/or by means of the spring elements of the driver's cab mount, and is inclined rearward in the case of longitudinal deceleration. In this embodiment, the driver's cab mount has active dampers whose extension height can be adjusted and/or spring elements whose height can be adjusted.

Forward inclination is understood to mean a tilting movement of the driver's cab during which the front side of the driver's cab when viewed in the direction of travel is tilted downward compared to the rear side of the driver's cab, with the result that during the longitudinal acceleration the front end of the driver's cab is at a lower position than the rear end of the driver's cab. An inclination to the rear is understood to mean the reverse tilting movement of the driver's cab, during which the side of the driver's cab is at the rear when viewed in the direction of travel is tilted downward compared to the front side of the driver's cab.

This principle is also known as so-called "Motion Cueing" from the field of movement simulators in order to influence the acceleration which can be perceived by a test specimen.

This embodiment provides the particular advantage that the comfort for the driver is increased even further during operation of the vehicle in the first driving mode, since the perception of longitudinal accelerations which the vehicle carries out can be significantly reduced.

One possibility of the implementation according to the present disclosure also provides that if the vehicle is operated in the first driving mode, transverse acceleration which can be perceived by an occupant of the driver's cab in the case of transverse acceleration of the vehicle is at least partially reduced by virtue of the fact that in the case of transverse acceleration of the vehicle the driver's cab is inclined to the side by means of the driver's cab mount. For example, in the case of transverse acceleration in the direction of travel to the right the right-hand side of the driver's cab is inclined downward compared to the left-hand side. Likewise, in the case of transverse acceleration in the direction of travel to the left the right hand side of the driver's cab is inclined upward compared to the left-hand side. In this embodiment, the driver's cab mount has active dampers and/or spring elements whose height can be adjusted. This embodiment therefore provides the advantage that transverse accelerations or lateral accelerations cannot be perceived any longer by occupants of the driver's cab or at least are only still perceived in a reduced fashion, which further increases the comfort within the driver's cab.

A further possibility of the implementation according to the present disclosure also provides that if the motor vehicle is operated in the first driving mode an inclination of the driver's cab of the motor vehicle to the rear, which is generated in the case of uphill travel, is at least partially reduced by virtue of the fact that the driver's cab is inclined forward by means of the driver's cab mount. In other words, a rearward inclination of the driver's cab which is generated by a gradient of the roadway is compensated by the corresponding opposing inclination, wherein the opposing inclination is generated by the driver's cab mount, e.g. by corresponding vertical adjustment of the spring-damper elements of the driver's cab mount. For this purpose, for example the rear damper elements and/or spring elements of the driver's cab mount can be extended and/or the front damper elements and/or spring elements of the driver's cab mount can be retracted.

Analogously, if the motor vehicle is operated in the first driving mode, a forward inclination of the motor vehicle, which is generated in the case of downhill travel, can be at least partially reduced by virtue of the fact that the driver's cab is inclined rearward by means of the driver's cab mount.

According to a further preferred embodiment, the damper force of the adjustable dampers of the driver's cab mount is adjusted according to the skyhook method, while a damper force of an adjustable damper of a chassis mount of the motor vehicle is adjusted according to the groundhook method. The skyhook method and the groundhook method are well known from the prior art as adjustment algorithms for adjusting adjustable dampers and do not have to be described in more detail here. The use of the skyhook method for the driver's cab mount with accompanying simultaneous use of the groundhook method for the chassis mount provides a particularly good interplay of comfort for driver's cab mount accompanied by simultaneous safety-oriented adjustment of the chassis.

According to a second aspect of the present disclosure, a control device for adapting the damper force of adjustable dampers of a driver's cab mount of a motor vehicle, in particular a utility vehicle, is made available. In this context, the control device is designed to carry out a method as described above.

In particular, the control device is designed to detect whether the motor vehicle is being operated in an autonomous or partially autonomous first driving mode in which the motor vehicle automatically carries out, by means of a driver assistance system, vehicle guidance comprising both a longitudinal guidance operation and a transverse guidance operation of the motor vehicle, or is being operated in a second driving mode in which a driver of the motor vehicle carries out at least part of the vehicle guidance himself. The control device is also designed to actuate or to adjust the adjustable dampers of the driver's cab mount in such a way that pitching and/or rolling movements are reduced compared to the second driving mode if the motor vehicle is being operated in the first driving mode.

In order to avoid repetitions, features which are disclosed as purely according to the method are to be disclosed and to be capable of being claimed also as according to the device, and vice versa. The abovementioned aspects and features according to the present disclosure, in particular with respect to the inclination of the driver's cab for reducing perceptible longitudinal acceleration and/or transverse acceleration in the driver's cab therefore also apply to the control device.

The present disclosure also relates to a motor vehicle, in particular utility vehicle, having such a control device. The motor vehicle also comprises a driver's cab and a driver's cab mount having adjustable dampers. The motor further comprises a driver assistance system, by means of which the motor vehicle can be operated in an autonomous or partially autonomous first during mode in which the motor vehicle automatically carries out, by means of a driver assistance system, vehicle guidance comprising both a longitudinal guidance operation and a transverse guiding operation of the motor vehicle. The motor vehicle can also be operated in a second driving mode in such a way that it can be controlled by the driver himself, in which driving mode a driver of the motor vehicle is intended to actively carry out at least part of the vehicle guidance himself.

The preferred embodiments and features of the present disclosure described above can be combined with one another in a desired fashion.

BRIEF DESCRIPTION OF THE FIGURES

Further details and advantages of the present disclosure are described below with reference to the appended drawings, in which.

DETAILED DESCRIPTION

Identical or functionally equivalent elements are denoted by the same reference symbols in all these figures and are in some cases not described separately.

Figure 1:
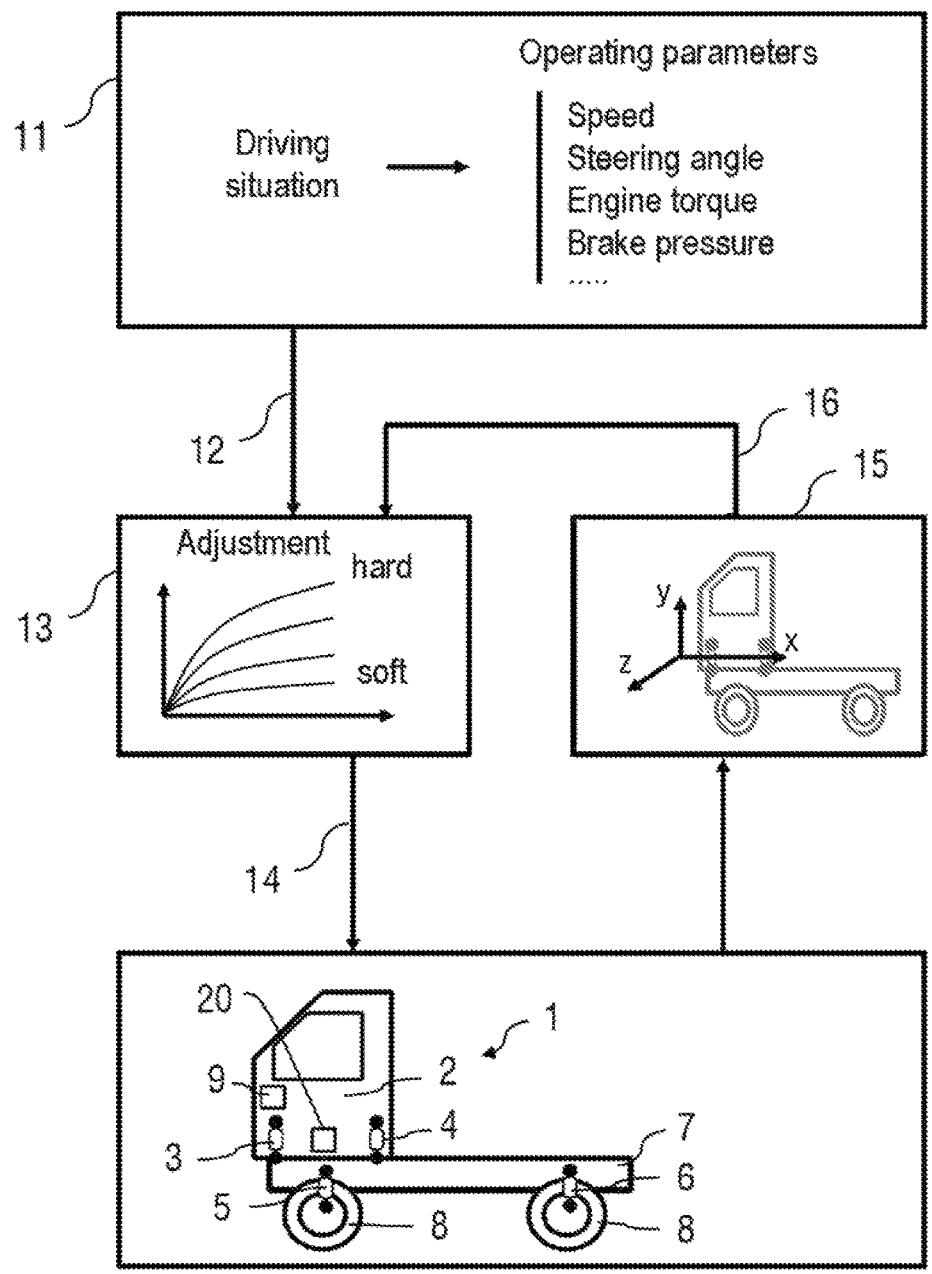
FIG. 1 shows a schematic flowchart illustrating a known method for adjusting adjustable dampers of a driver's cab mount.

FIG. 1 shows a schematic flowchart 10 illustrating an adjustment method, known per se, for adjusting the damper force of adjustable dampers of a driver's cab mount of a utility vehicle. FIG. 1 shows in the lower image a utility vehicle 1 in a highly schematic illustration. The vehicle frame 7 is connected in a sprung and damping fashion to the vehicle wheels 8 by means of a separate mount (chassis mount), wherein a plurality of spring/damper elements 5, 6 are also used here in turn.

Since in such vehicles the spring rates or damper rates of the spring/damper elements 5, 6 of the chassis have to be selected to have comparatively high values owing to considerable vehicle weights and owing to the high sprung masses in the chassis, roadway unevennesses or even vibrations from the axles and drivetrain are firstly still transmitted to a considerable extent to the vehicle frame 7 via the axle suspension system. For this reason it is necessary to decouple the driver's cab 2 once more separately from the vehicle chassis 7 by means of a separate suitable driver's cab mount. The driver's cab 2 is therefore mounted on the vehicle frame 7 by means of a driver's cab mount. The driver's cab mount comprises for this purpose a plurality of adjustable spring/damper units 3, 4 whose damper force can be set by means of a control device 20. The spring/damper units 3, 4 of the driver's cab mount may, for example, merely be pressure-adjustable air springs.

The flowchart 10 in FIG. 1 illustrates a known means of adjusting the driver's cab damping which solves the conflict of objectives between comfort and stability and which is used, in particular, for the travel in the second driving mode. When travel is active, an operating strategy is to be implemented which makes available a high level of spring comfort and damping comfort, and at the same time the driver's cab is to be well secured in the case of load change reactions and dynamic driving states (such as e.g. starting, braking, accelerating or cornering). Likewise, pitching compensation is implemented in the case of starting processes, gear shifting processes and braking process.

For this purpose, the instantaneous driving situation is determined continuously in a step 11 on the basis of various operating parameters. Examples of suitable operating parameters are the velocity of the utility vehicle, the steering angle, the engine torque, the brake pressure etc. These operating parameters can be determined by means of the vehicle sensor system. The current values of these operating parameters are transferred continuously in a step 12 to a control device 20 in which various adjustment characteristic curves 13 are stored. The control device 20 detects a specific driving situation from the operating parameters and correspondingly selects a characteristic curve which has been previously assigned to the driving situation and is then used as the basis for the driver's cab mount.

In this context, in a normal operating mode of the vehicle the driver's cab 2 is adjusted to high comfort, i.e. a characteristic curve is selected which brings about the softest possible damping of the driver's cab 2. If, in contrast, a driving situation is detected which corresponds to a highly dynamic driving manoeuver, e.g. starting, braking, cornering, etc. a harder characteristic curve is selected.

The control device 20 then adjusts the damper force of the adjustable dampers 3, 4 as a function of the respectively currently selected characteristic curve, which is illustrated by the step 14. The reactions of the driver's cab 2, for example the movement thereof in the x, y and z directions, are monitored continuously as part of the closed-loop control circuit, which is illustrated schematically by the step 15. These deviations are fed back as a controlled variable to the control device 20, which then determines correspondingly adapted manipulated variables for the closed-loop control circuit as a function of the value of the controlled variable.

The closed-loop control circuit is therefore embodied in such a way that for reasons of comfort it is generally attempted to implement the softest possible damping of the driver's cab, but in the case of dynamic processes such as lane changing, braking processes or gear shifting processes, the damper force is temporarily increased.

Figure 2:
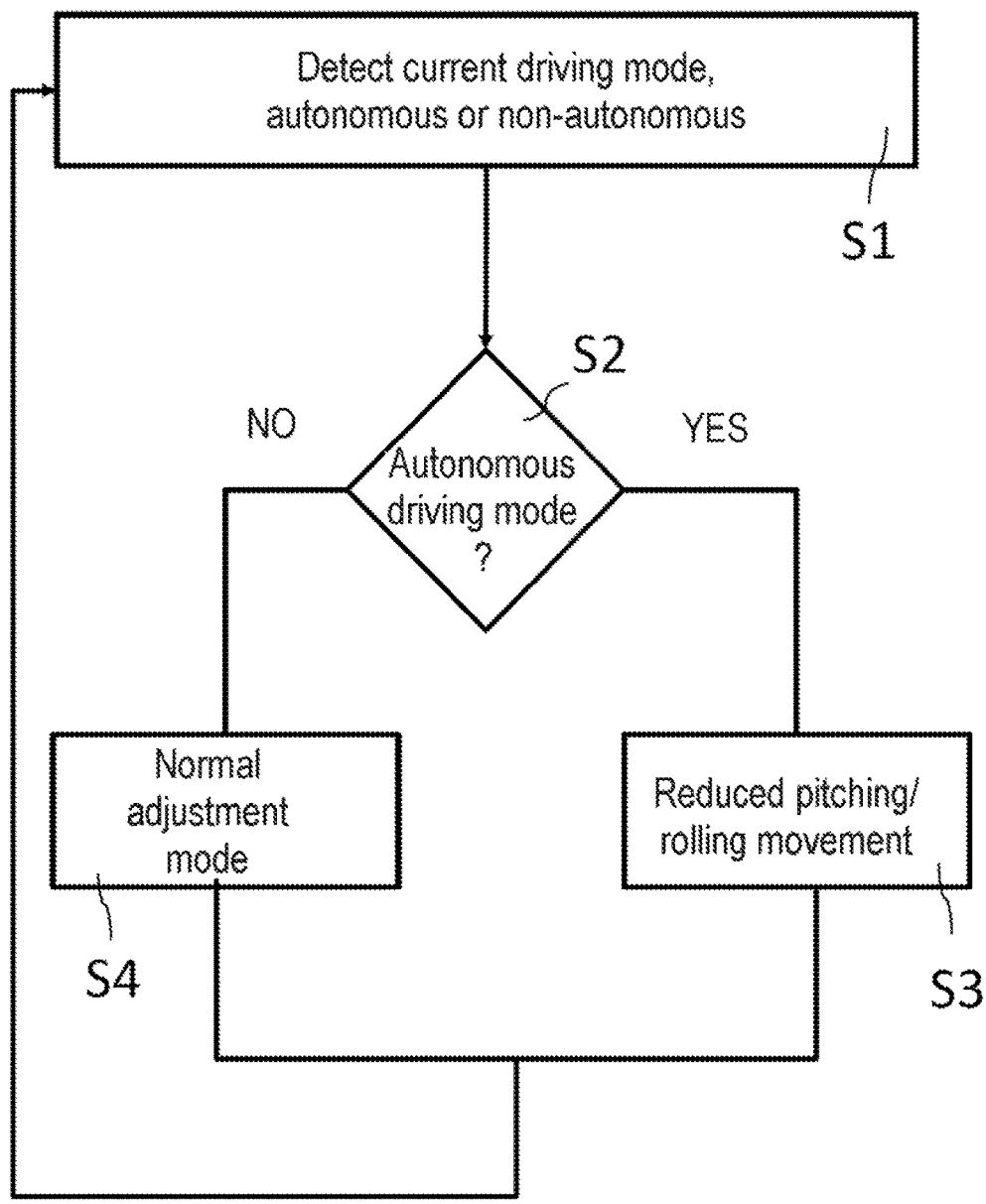
FIG. 2 shows a schematic flowchart illustrating a method for adjusting the damper force of adjustable dampers of a driver's cab mount according to an exemplary embodiment of the present disclosure.

FIG. 2 then shows a schematic flowchart of a method for adjusting the damper force of adjustable dampers of a driver's cab mount of a motor vehicle according to one embodiment of the present disclosure.

The utility vehicle 1 can be operated here, in particular, in an autonomous or partially autonomous first driving mode in which the utility vehicle 1 automatically carries out, by means of the driver assistance system 9, vehicle guidance comprising both a longitudinal guidance operation and a transverse guidance operation of the utility vehicle 1. However, the utility vehicle 1 can also be operated in a second driving mode in such a way that it can be controlled by the driver, in which driving mode a driver of the utility vehicle 1 is intended to carry out at least part of the vehicle guidance himself. The driver can therefore decide himself whether he would like to cause the utility vehicle to drive selectively autonomously, e.g. in a piloted fashion, or whether he would like to actively control it himself.

In the (partially) autonomous driving mode, there is no need for any permanent monitoring of the vehicle guidance by the driver, with the result that the driver can dedicate himself to other activities such as e.g. reading or working. So that the driver can carry out these secondary activities with as little possible stimulation from the outside and as far as possible without being fatigued, the adjustable dampers 3, 4 of the driver's cab mount are actuated or adjusted in such a way that pitching and/or rolling movements are reduced in the first driving mode compared to the second driving mode. For this purpose, the current driving mode of the vehicle is continuously monitored in a step S1.

If it is detected here (step S2) that the vehicle is currently not in the autonomous driving mode but rather in the second driving mode in which the driver actively steers the utility vehicle himself, in step S4 an adjustment, known per se, of the driver's cab mount is carried out, for example an adjustment such as has been described previously within the scope of FIG. 1.

However, if it is detected in step S2 that the utility vehicle 1 is currently being operated in a (partially) autonomous driving mode, the open-loop or closed-loop control of the adjustable dampers 3, 4 of the driver's cab mount is adjusted in step S3 in such a way that the pitching and/or rolling movements of the driver's cab 2 are reduced compared to the second driving mode. As a result, the most comfortable possible damping of the driver's cab mount is implemented, said damping largely insulating the driver from the influence of the driving movements. In this context, known approaches for reducing pitching and/or rolling movements can be used, but in the partially autonomous or autonomous driving mode pitching and/or rolling movements are compensated or reduced to a greater extent than in the active driving mode. In order to reduce pitching and/or rolling movements, a temporarily relatively hard damper setting can be set, for example. While in the active driving mode the driver receives corresponding feedback from the vehicle in response to steering requests, braking requests or acceleration requests and said feedback turns out as expected and therefore contributes to the driving safety, in the (partially) autonomous mode the driver is largely freed of vehicle movements since he does not influence the events on the road.

Figure 3:
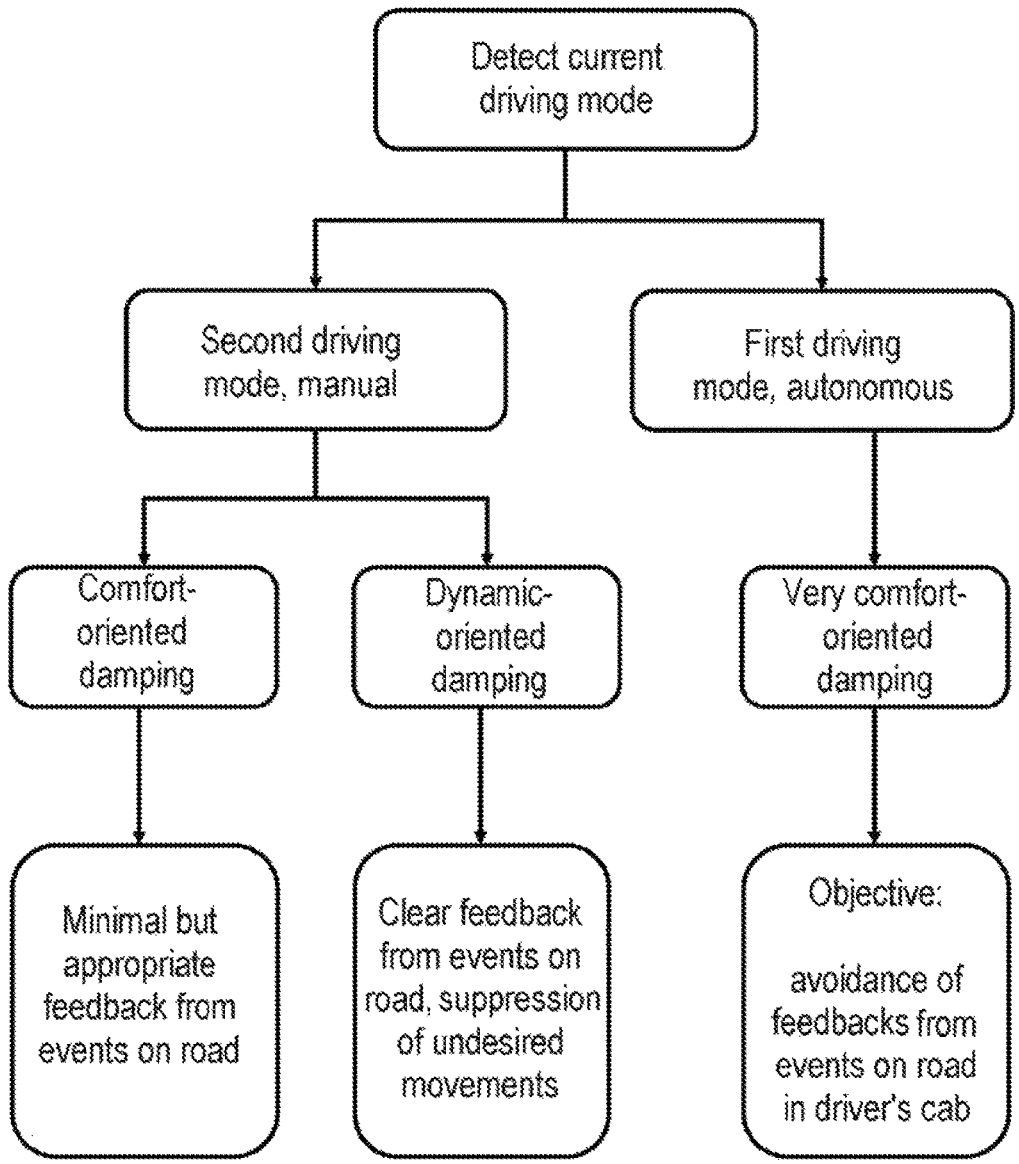
FIG. 3 shows a schematic flowchart illustrating a method for adjusting the damper force of adjustable dampers of a driver's cab mount according to an exemplary embodiment t of the present disclosure.

FIG. 3 shows a further schematic flowchart of the implementation of a method for adjusting the damper force of adjustable dampers according to a further embodiment of the present disclosure, from which method develops the adjustment method known per se, for the case in which the driver switches into the first driving mode in which the vehicle is operated (partially) autonomously.

In this context, the continuous current driving mode is again detected first, i.e. it is determined whether the utility vehicle 1 is in the first driving mode in which the utility vehicle is operated autonomously or at least semi-autonomously or whether the utility vehicle is in the second driving mode in which it is controlled manually via the driver.

However, if the utility vehicle is in the second driving mode in which the utility vehicle is actively controlled by the driver, the driver's cab mount is adjusted according to the adjustment method in FIG. 1. In this context, for normal driving states as far as possible comfort oriented damping is selected in order to permit minimum, but at least appropriate, feedback of the events on the road into the driver's cab. In dynamic driving situations such as lane changes, braking processes or gear shifting processes, there is, however, a changeover to dynamics-oriented damping, i.e. in this context the damper force is temporarily increased and a relatively hard damper characteristic curve is selected in order in this way to provide significant feedback of the events of the road into the driver's cab and at the same time suppress undesired movements.

However, if the utility vehicle is in the first driving mode, very comfort-oriented damping is selected during which pitching movements and rolling movements are reduced to a greater extent than in the second driving mode, with the objective of as far as possible avoiding feedback from the events of the road back into the driver's cab.

Figure 4:
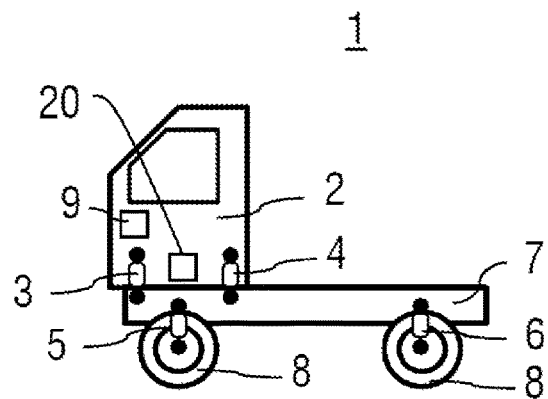
FIG. 4A to 4C show compensation movements of the driver's cab according to a further exemplary embodiment of the present disclosure.
Figure 4:
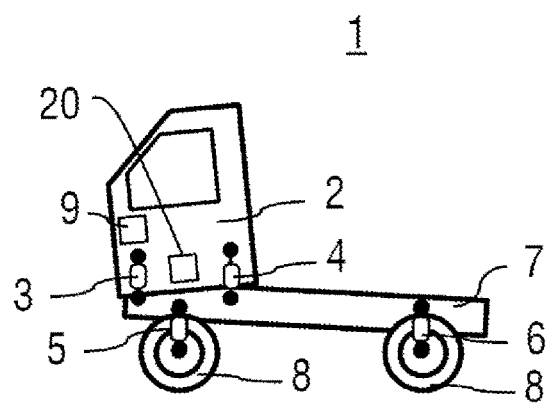
Figure 4:
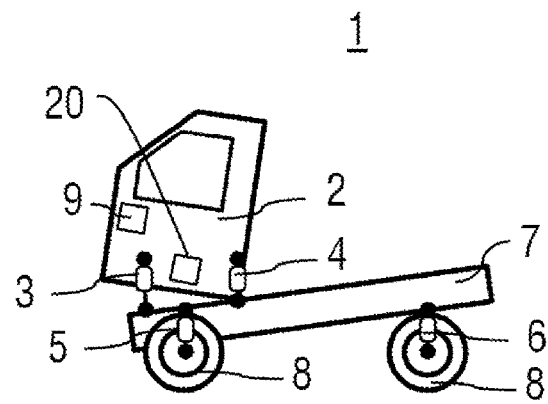

A further embodiment of the present disclosure is illustrated on the basis of the partial figures A to C in FIG. 4. According to this embodiment, the damper elements 3, 4 of the driver's cab mount are embodied as active dampers which depending on activation can also generate an active pitching movement or tilting movement of the driver's cab 2.

FIG. 4A shows a state of the utility vehicle 1 in which the utility vehicle is moved at a uniform speed. In contrast, FIG. 4B illustrates an acceleration process of the utility vehicle, and FIG. 4C illustrates a braking process of the utility vehicle.

As illustrated in FIG. 4B, in the case of an acceleration process, the chassis 7 inclines slightly upward at the front side, while in the case of a braking process precisely the opposite effect occurs, as illustrated in FIG. 4C, with the result that the front side of the chassis 7 inclines downward. The effects are illustrated in exaggerated form in FIGS. 4B and 4C.

The following embodiments relate exclusively to the first driving mode, i.e. to a situation in which the utility vehicle is operated autonomously or at least partially autonomously.

If it is detected in the first driving mode that the utility vehicle 1 carries out a positive longitudinal acceleration as illustrated schematically in FIG. 4B, the driver's cab 2 is actively inclined downward by means of the active dampers 3, 4 in the front region, e.g. in that the rear active dampers extend (and/or the front dampers retract). This has the effect that a longitudinal acceleration which can be perceived by an occupant of the driver's cab 2 is partially reduced or preferably entirely reduced, with the result that the occupant in the driver's cab 2 does not perceive the longitudinal acceleration at all. In an analogous fashion, in the case of longitudinal deceleration (negative longitudinal acceleration) of the utility vehicle 1, as illustrated in FIG. 4C, the driver's cab 2 is inclined rearward, e.g. in that the front active dampers are extended (and/or the rear dampers are retracted). This in turn has the effect that a longitudinal deceleration which can be perceived by an occupant of the driver's cab is reduced. It is emphasized that the tilting effects in FIGS. 4B and 4C are greatly exaggerated and are not illustrated true to scale. The described system for compensating the longitudinal acceleration can also be illustrated with just two active damper elements (front or rear).

In the same way, the effects of transverse acceleration can be compensated, with the result that the occupants of the driver's cab do not perceive the occurrence of transverse accelerations of the driver's cab. In this context, depending on the driving of the transverse acceleration, the driver's cab is inclined either to one side or to the other in that the active dampers are correspondingly retracted or extended only on one side of the driver's cab.

Although the present disclosure has been described with reference to specific exemplary embodiments, it is apparent to a person skilled in the art that various changes can be implemented and equivalents can be used as a replacement without departing from the scope of the present disclosure. In addition, many modifications can be implemented without departing from the associated scope. Consequently, the present disclosure is not to be limited to the disclosed exemplary embodiments but instead is to comprise all exemplary embodiments which are covered by the scope of the appended patent claims. In particular, the present disclosure also claims protection for the subject matter and for the features of the dependent claims independently of the claims which are referred to.

LIST OF REFERENCE NUMBERS

1 Utility vehicle
2 Driver's cab
3, 4 Adjustable dampers of the driver's cab mount
5, 6 Adjustable dampers of the chassis
7 Vehicle frame (chassis)
8 Tyre
9 Driver assistance system for autonomous vehicle guidance
10 Flowchart
11-16 Adjustment steps of an adjustment method for detecting the damper force of a driver's cab mount
20 Control device

We claim:
1. A method for performing open-loop or closed-loop control of a driver's cab mount of a motor vehicle, wherein the driver's cab mount has dampers whose damper force can be adjusted, wherein the motor vehicle can be operated in an autonomous or partially autonomous first driving mode in which the motor vehicle automatically carries out, by means of a driver assistance system, vehicle guidance comprising both a longitudinal guidance operation and a transverse guidance operation of the motor vehicle; and in a second driving mode wherein said motor vehicle is configured for at least partial control by a driver, such that the driver caries out at least part of the guidance wherein when the motor vehicle is operated in the first driving mode, the adjustable dampers of the driver's cab mount are actuated or adjusted in such a way that pitching or rolling movements are reduced compared to the second driving mode, and wherein, a) adjustment of the damper force of the adjustable dampers of the driver's cab mount only according to the Skyhook method; and b) adjustment of a damper force of an adjustable damper of a chassis mount of the motor vehicle only according to the groundhook method.

2. The method according to claim 1, wherein when the motor vehicle is operated in the first driving mode a perceived longitudinal acceleration within a driver's cab in the case of longitudinal acceleration of the motor vehicle is at least partially reduced by inclination of the driver's cab forward by means of the driver's cab mount and is inclined rearward in the case of longitudinal deceleration.

3. The method according to claim 1, wherein when the motor vehicle is operated in the first driving mode, perceived transverse acceleration within a driver's cab in the case of transverse acceleration of the motor vehicle is at least partially reduced by inclination of the driver's cab to the side by means of the driver's cab mount.

4. The method according to claim 1, wherein when the vehicle is operated in the first driving mode, a) an inclination of a driver's cab of the motor vehicle to the rear, which is generated in the case of uphill travel, is at least partially reduced by inclination of the driver's cab forward by means of the driver's cab mount; or b) a forward inclination of the motor vehicle, which is generated in the case of downhill travel, is at least partially reduced by inclination of the driver's cab rearward by means of the driver's cab mount.

5. A control device for adapting a damper force of adjustable dampers of a driver's cab mount of a motor vehicle, the control device configured:

a) to detect whether the motor vehicle is being operated in an autonomous or partially autonomous first driving mode in which the motor vehicle automatically carries out, by means of a driver assistance system, vehicle guidance comprising both a longitudinal guidance operation and a transverse guidance operation of the motor vehicle, or is being operated in a second driving mode, wherein the second driving mode is configured for at least partial control by a driver, such that the driver of the motor vehicle carries out at least part of vehicle guidance, and b) if the motor vehicle is being operated in the first driving mode, to actuate or adjust the adjustable dampers of the driver's cab mount in such a way that pitching or rolling movements are reduced compared to the second driving mode, wherein adjustment of the damper force of the adjustable dampers of the driver's cab mount only according to the Skyhook method; and adjustment of a damper force of an adjustable damper of a chassis mount of the motor vehicle only according to the groundhook method.

6. The control device of claim 5, wherein the motor vehicle is a utility vehicle.

7. A motor vehicle, comprising:

a driver's cab;

a driver's cab mount having adjustable dampers; and a control device configured:

a) to detect whether the motor vehicle is being operated in an autonomous or partially autonomous first driving mode in which the motor vehicle automatically carries out, by means of a driver assistance system, vehicle guidance comprising both a longitudinal guidance operation and a transverse guidance operation of the motor vehicle, or is being operated in a second driving mode, wherein the second driving mode is configured for at least partial control by a driver such that the driver of the motor vehicle carries out at least part of vehicle guidance, and b) if the motor vehicle is being operated in the first driving mode, to actuate or adjust the adjustable dampers of the driver's cab mount in such a way that pitching and/or rolling movements are reduced compared to the second driving mode wherein, adjustment of the damper force of the adjustable damper's of the driver's cab mount only according to the Skyhook method; and adjustment of a damper force of an adjustable damper of a chassis mount of the motor vehicle only according to the groundhook method.

8. The motor vehicle of claim 7, wherein the motor vehicle is a utility vehicle.

\* \* \* \* \*